UNITED STATES PATENT OFFICE.

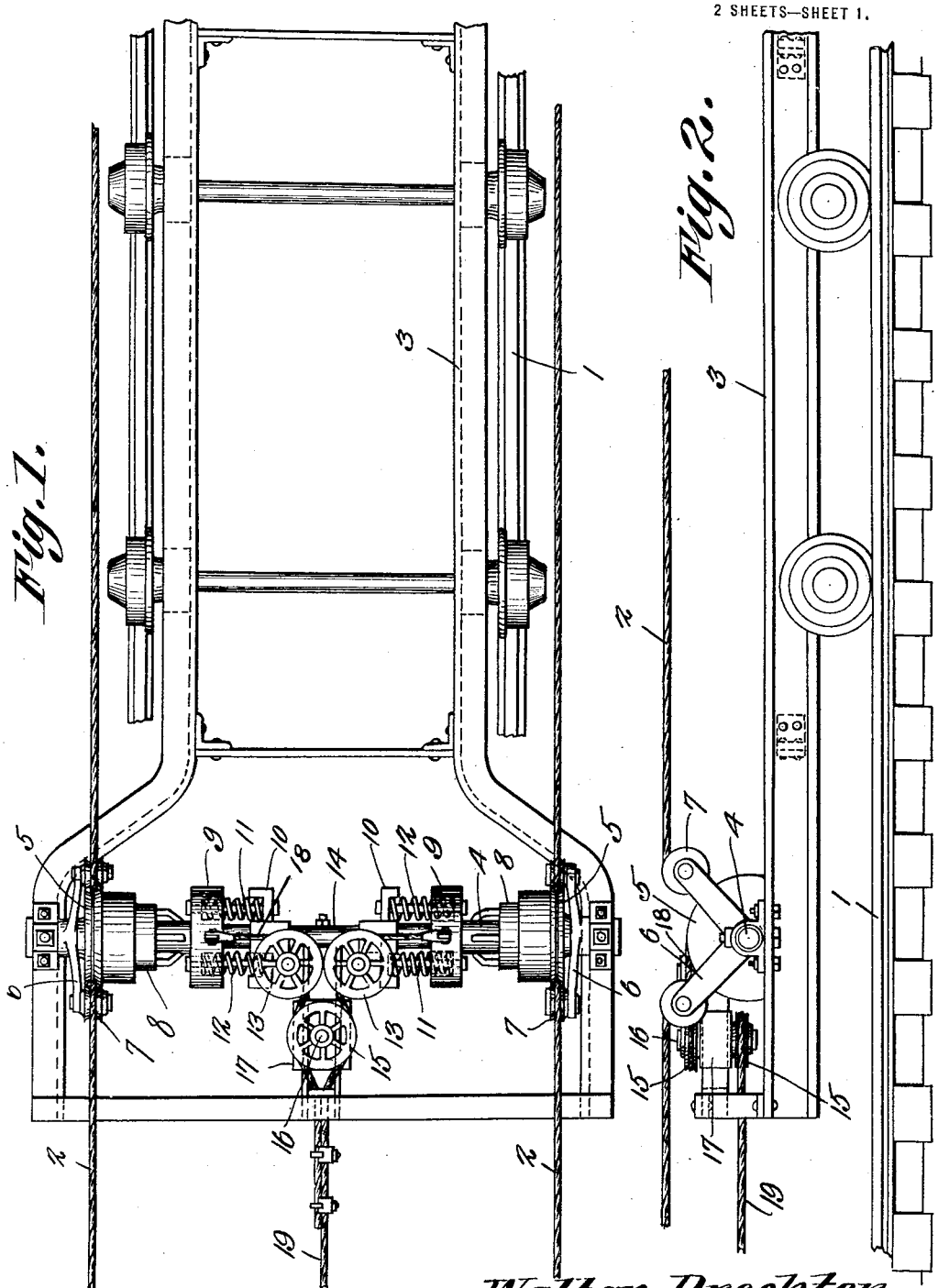

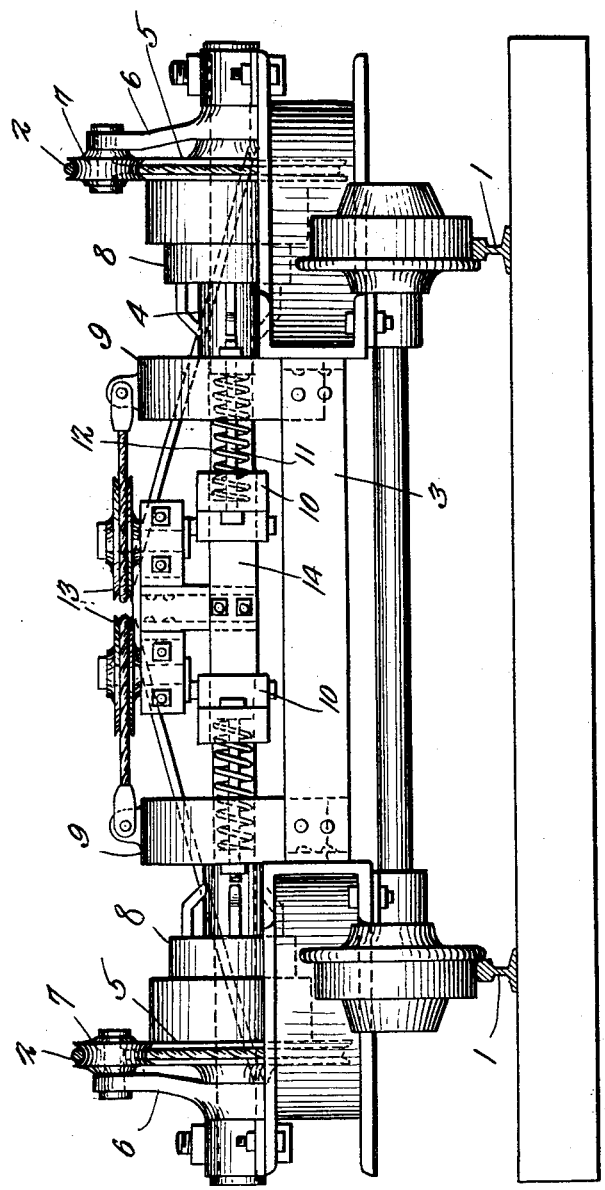

WALTER PROCKTER, OF YAMACRAW, KENTUCKY.

HOIST.

1,410,118.  Specification of Letters Patent.  Patented Mar. 21, 1922.

Application filed September 18, 1920. Serial No. 411,028.

*To all whom it may concern:*

Be it known that I, WALTER PROCKTER, a citizen of the United States, residing at Yamacraw, in the county of McCreary and State of Kentucky, have invented new and useful Improvements in Hoists, of which the following is a specification.

This invention relates to safety hoists for use on cars operating upon inclined or vertical tracks, the principal object of the invention being to provide spring operated means for gripping one or more cables if any part of the hoisting device should break.

Another object of the invention is to so arrange the parts that the pull of the hoisting cable will hold the gripping means in inactive position by contracting the springs.

A further object of the invention is to provide a set of cable engaging sheaves which normally run idle on the safety cable and a friction clutch which is forced against one of said sheaves by the spring means if the hoisting apparatus or its cable should break.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention.
Figure 2 is a side view.
Figure 3 is an end view.

In these views 1 indicates the track and 2 the safety cables which are located along the track with their ends attached to suitable supports of sufficient strength to carry the weight of the truck or car. 3 indicates the car, the wheels of which engage the track, and 4 indicates a stationary shaft or axle which is suitably attached to the car, preferably at one end thereof. Adjacent each end of this axle is arranged the grooved wheel 5 which is free to rotate on said axle and the groove in which is of V-shape in cross section. Adjacent each wheel 5 is a V-shaped frame 6 which is also loosely arranged on the axle and the extremities of this frame carry the grooved pulleys 7, the grooves of which are of U-shape in cross section. The safety cables 2 pass around the wheels 5 and upwardly over the pulleys 7 and as the wheels and pulleys are free to rotate their engagement with the cables will not retard the movement of the car.

A pair of friction clutches 8 are slidably mounted on the axle with the friction face of each clutch adjacent the inner face of one of the wheels 5. Secured to the inner end of each clutch is a housing 9 and a pair of frames 10 is attached to the axle, each frame being spaced from one of the housings 9. Bolts 11 pass through each frame and the adjacent housing and coil springs 12 are arranged on said bolts with their ends bearing against the housing and frame. These springs tend to force the clutches outwardly against the wheels 5. A pair of sheaves 13 is arranged upon vertical axes which are supported by the frame 14 carried by the axle and a pair of sheaves 15 is arranged on a stub shaft 16 which is mounted in a block 17 slidably mounted in a part of the frame. A cable 18 has its ends secured to the housings 9 and this cable passes over the sheaves 13 and has its central part looped around the upper sheave 15. The lower sheave 15 receives the hoisting cable 19.

It will thus be seen that the load on hoisting cable 19 will cause the block 17 and the sheaves carried thereby to move outwardly thus pulling on the looped part of cable 18 which will move the housings and the clutches inwardly towards each other. This movement will contract the springs 11. If any part of the hoisting apparatus or its cable 19 should break the springs 12 will force the clutches away from each other and place their clutch faces in engagement with the wheels 5, thus holding said wheels from rotating and causing them to grip the safety cables in their V-shaped grooves. The car will thus be prevented from running down the grade as the sheaves acting on the cables will act as a break and bring the car to a stop.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a car and its track, a safety cable placed alongside the track, sheaves engaging said cable, spring actuated clutch means for engaging one of the sheaves to prevent its rotation and means for connecting the hoisting cable with said clutch means for holding the clutch means in inactive position by the pull of the hoisting cable.

2. In combination with a car and its track, a safety cable located alongside the track, a shaft carried by the car, a grooved wheel rotatably mounted on the shaft and engaging a loop in the safety cable, guiding sheaves associated with the said wheel and engaging the cable, a clutch for engaging the wheel, spring means for holding the clutch in engagement with the wheel, a hoisting rope for the car and means for connecting said rope with the clutch means so that the pull of said rope will move the clutch means into inactive position.

3. In combination with a car and its track, a safety cable placed alongside the track, a grooved wheel rotatably mounted on the car and engaging the loop in the cable, guiding sheaves associated with the wheel and engaging the cable, a friction clutch, spring means for forcing the same into engagement with the wheel, a slidable part on the car, a hoisting cable connected with said sliding part and a cable connecting the sliding part with the clutch means.

4. In combination with a car and its track, a safety cable placed alongside the track, a shaft carried by the car, a grooved wheel rotatably mounted on the shaft and engaging a loop in the cable, a frame loosely mounted on the shaft, a pair of guiding sheaves carried by the frame and engaging the cable, a clutch slidably mounted on the shaft, a spring for forcing the clutch into engagement with the wheel, a sliding part on the car, a hoisting rope connected with said part and a cable connecting said part with the clutch means.

5. In combination with a car and its track, a pair of safety cables placed alongside the track, a shaft carried by the car, a pair of grooved wheels carried by the shaft, one adjacent each end thereof, said wheels engaging loops in the cables, a pair of frames loosely mounted in the shaft adjacent the wheels, grooved sheaves carried by the frames and engaging the cables, a pair of friction clutches slidably mounted on the shafts, springs for forcing the pulleys against the grooved wheels, a sliding part on the car, a pulley carried thereby, stationary guiding pulleys, a cable having its ends connected with parts on the friction clutches and passing over the stationary pulleys and looped around the pulley on the sliding part and a hoisting cable connected with said sliding part.

In testimony whereof I affix my signature.

WALTER PROCKTER.